UNITED STATES PATENT OFFICE.

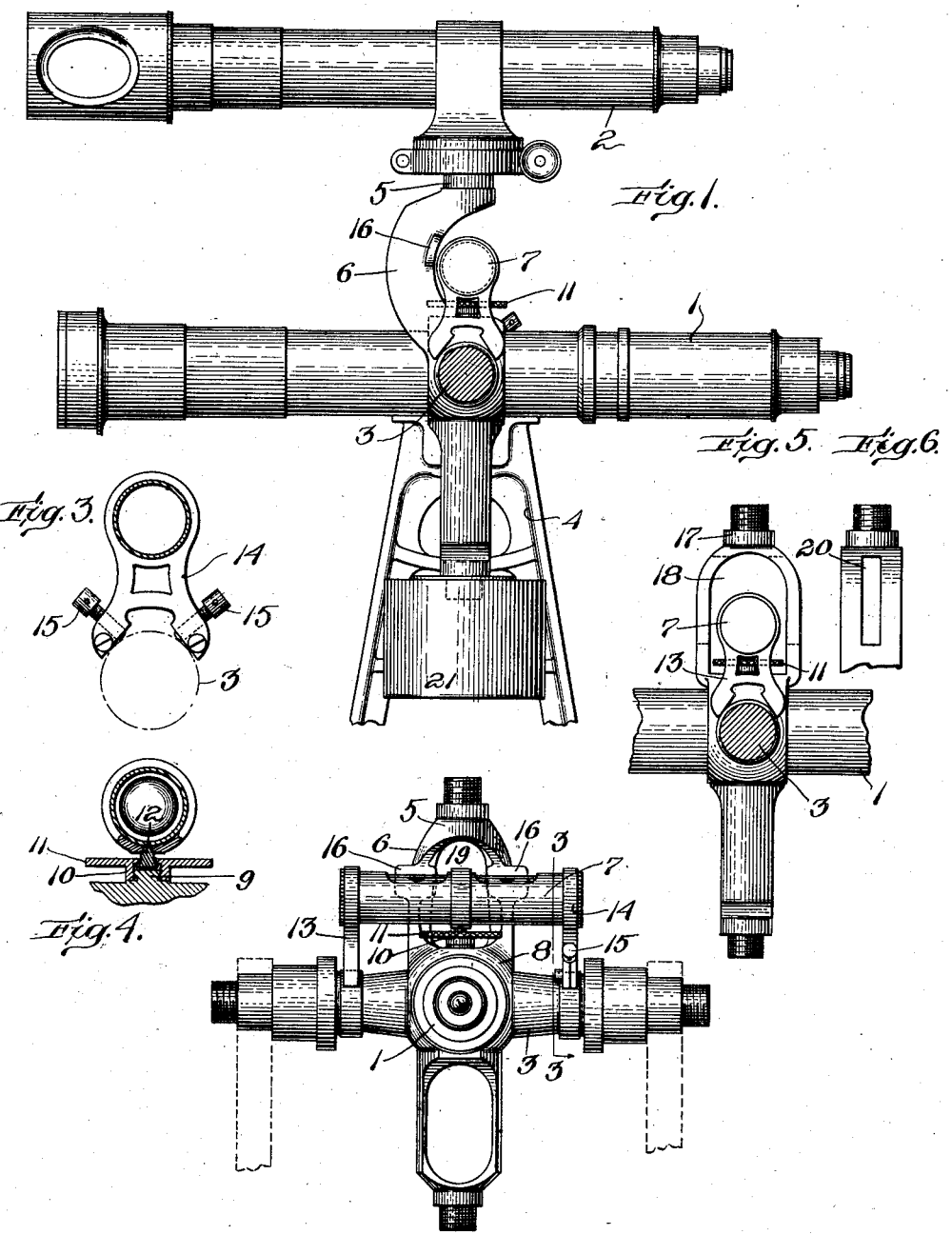

WILLIAM A. BERGER, OF BOSTON, MASSACHUSETTS.

MINE-TRANSIT.

No. 902,272.  Specification of Letters Patent.  Patented Oct. 27, 1908.

Application filed May 18, 1908. Serial No. 433,418.

*To all whom it may concern:*

Be it known that I, WILLIAM A. BERGER, a citizen of the United States, residing at Boston, in the county of Suffolk and State of Massachusetts, have invented an Improvement in Mine-Transits, of which the following description, in connection with the accompanying drawings, is a specification, like letters on the drawings representing like parts.

In mining work or steep sighting, it is very essential that the transit should have the horizontal axis truly horizontal, for reasons well known to mine surveyors, and as the auxiliary telescope (such as shown in the Berger patent #559117, Apr. 28, 1896) is the one relied upon for this steep sighting, the result is that it becomes especially important to provide a construction permittting the ready and instant leveling of the horizontal axis of a top telescope instrument to a truly horizontal plane. Accordingly my invention resides in providing a top telescope instrument with such a construction that a striding level may be placed in proper position above the horizontal axis to enable the operator at any moment to adjust said axis to a truly horizontal position, my invention also preferably including, in said construction, means for enabling the level to be seen readily in the comparative darkness of the mine.

In the accompanying drawings, in which I have shown a preferred embodiment of my invention; Figure 1 shows the upper portion of the instrument in side elevation, the horizontal axis being shown in transverse section; Fig. 2 is a view thereof, in end elevation, the horizontal axis being shown in side elevation; Fig. 3 is a cross sectional view of the stride level taken on the dotted line 3, Fig. 2; Fig. 4 is a fragmentary cross sectional view through the central portion of the stride level; and Figs. 5 and 6 are fragmentary views in side and front elevation, respectively, showing a modified construction for permitting the use of the stride level.

It will be understood that the main telescope 1 and the auxiliary telescope 2 carried thereby, may be of any usual or preferred construction, the horizontal axis 3 being supported at its opposite ends in usual manner in the uprights or standards 4 of a mine transit head. The Berger patent No. 559117, above referred to, shows the usual construction of the so called vertical post which supports the top telescope 2 on the main telescope 1 in parallel alinement therewith, and for many years (ever since the granting of the said Berger patent) various more or less awkward and inconvenient expedients have been resorted to for adjusting the horizontal axis to a true horizontal plane, as it was considered impossible to employ an ordinary stride level.

I provide a vertical supporting post 5 for the auxiliary telescope 2 having a forwardly bending or deflected portion 6, whose inward curvature extends forward sufficiently to permit a striding level 7 to lie in the vertical plane of said post and the horizontal axis 3 while resting in natural position on said horizontal axis. By this means the striding level 7 may readily be used with the top telescope instrument to enable the operator to bring into true position the horizontal axis 3 on which the top telescope 2 swings. The horizontal axis 3 or rather its central hub portion 8 is provided preferably centrally at the point of intersection of the vertical planes of said horizontal axis and of the main telescope, with a threaded base 9 for receiving a threaded nut 10 thereon, shown as provided with a widely extending thumb portion or rim 11, said nut having swivel connection at 12 with the barrel or frame work of the stride level. The latter is provided at its opposite ends with usual striding legs 13, 14 and adjusting screws 15. Thus it will readily be seen that the striding level 7 may be conveniently placed on the horizontal axis 3 in proper vertical position when the main telescope 1 is opening horizontally, said level then being in a vertical plane which includes said horizontal axis and the vertical axis of the auxiliary telescope and being held by the nut 10 against accidentally dropping off from the main telescope in case the instrument should be reversed. The swivel connection 12 is more or less loose so as not to interfere in any way with the automatic adjustment of the level by the engagement of its legs with the horizontal axis 3. As the overhanging post 5 increases somewhat the difficulty of observing the bubble of the level, which is already extremely difficult in the darkness of a mine, I broaden out the front edge of the curved portion 6 and the post 5 or otherwise provide beyond the level reflecting surfaces 16 which are painted or enameled white so that the position of the bubble can readily be seen as it stands out against this white reflecting surface, notwithstanding the semi-darkness of the mine where this type of instrument is usually used.

As I consider my invention broadly new in the various respects hereinafter claimed, I wish it understood that my invention is not limited to the constructional details herein preferred as many changes in form and arrangement of parts may be resorted to without departing from the spirit and scope of my invention.

In Figs. 5 and 6 I have shown a vertical post 17 containing a transverse opening 18 in line with the telescope axis 3 for receiving the striding level 7, and in this case, instead of having a sight opening of the form shown at 19 in my preferred construction (Fig. 2), I have a somewhat narrower slot or sight opening 20. It will be understood, however, as just mentioned, that I am not restricted to any particular detail in these respects.

The natural and preferable position of the striding level is vertically above the main telescope but it will be understood that in speaking of said striding level as above said instrument, I mean merely that it should occupy a proper striding position with reference to the main axis 3 irrespective of whether it is technically above or beneath said axis, inasmuch as the construction would be substantially the same in either case as these instruments are usually constructed for reversal, as is well understood in the profession. For example, in Fig. 2 I have omitted the top telescope 2 and the weight 21 so as to show clearly the similar threaded ends, and it will be understood that simply by reversing the instrument i. e. turning the horizontal axis over a half revolution, the striding level would be brought on the under side of the main telescope where it could be used (by tightening nut 10) although not to such good advantage as in its normal position as shown in Fig. 1.

Having described my invention, what I claim as new and desire to secure by Letters Patent, is:—

1. In a mining transit, a main telescope, its horizontal axis, an auxiliary telescope adapted to be mounted in vertical alinement above said main telescope, means for rigidly supporting said telescope in said position, said support means being deflected at a point between horizontal axis and the auxiliary telescope sufficiently to permit a striding level to rest in the usual position on said horizontal axis in the vertical plane of said horizontal axis and the vertical axis of the auxiliary telescope.

2. In a mining transit, a main telescope, its horizontal axis, a striding level mounted on said horizontal axis, and a vertical support extending around said striding level for supporting beyond the striding level another portion of the instrument.

3. In a mining transit, a main telescope, its horizontal axis, a striding level mounted on said horizontal axis, a support extending around said striding level for supporting beyond the striding level another portion of the instrument, and reflecting means carried by said support at one side of said striding level for facilitating the reading of the latter.

4. The combination with a surveying telescope and its horizontal axis, of a striding level for striding said horizontal axis, reflecting means at the back of said level, and a support extending from said telescope for supporting said reflecting means.

5. The combination with a surveying telescope and its horizontal axis, of a member extending at one side of said horizontal axis provided with a sighting aperture for sighting in the vertical plane of said telescope, said member being provided with a reflector in position to facilitate the reading of a striding level when mounted on said horizontal axis and said striding level therefor.

In testimony whereof, I have signed my name to this specification, in the presence of two subscribing witnesses.

WILLIAM A. BERGER.

Witnesses:
 Louis H. Berger,
 Harry M. Griffin.